United States Patent
Ohashi

(10) Patent No.: US 8,226,064 B2
(45) Date of Patent: Jul. 24, 2012

(54) PIVOT CONNECTING STRUCTURE

(75) Inventor: Masatsugu Ohashi, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 483 days.

(21) Appl. No.: 12/475,316

(22) Filed: May 29, 2009

(65) Prior Publication Data
US 2009/0309003 A1   Dec. 17, 2009

(30) Foreign Application Priority Data
Jun. 12, 2008   (JP) ................................. 2008-154337

(51) Int. Cl.
*A47G 1/24* (2006.01)
(52) U.S. Cl. ........ 248/481; 248/479; 248/476; 248/478; 248/549; 359/872; 403/90; 403/123; 403/129
(58) Field of Classification Search .................. 248/549, 248/484, 481, 483, 476, 218.4, 288.31, 276.1, 248/480, 482, 488, 479, 475.1, 478, 274.1; 359/880, 872, 871, 879, 838; 403/56, 334, 403/344, 123, 128, 129, 131
See application file for complete search history.

(56) References Cited

U.S. PATENT DOCUMENTS

| | | | | |
|---|---|---|---|---|
| 4,382,572 A | * | 5/1983 | Thompson | ..................... 248/484 |
| 5,100,095 A | * | 3/1992 | Haan et al. | ..................... 248/549 |
| 5,377,948 A | * | 1/1995 | Suman et al. | .................. 248/549 |
| 6,068,380 A | * | 5/2000 | Lynn et al. | ..................... 359/871 |
| 7,008,069 B2 | * | 3/2006 | Ostreko et al. | ................ 359/876 |
| 7,104,663 B2 | * | 9/2006 | Whitehead | ..................... 359/872 |
| 7,156,358 B2 | * | 1/2007 | March et al. | .................. 248/549 |
| 2004/0195486 A1 | * | 10/2004 | Rumsey et al. | ............... 248/481 |
| 2010/0302661 A1 | * | 12/2010 | Lee | .............................. 359/872 |

FOREIGN PATENT DOCUMENTS

| | | |
|---|---|---|
| JP | 47-5962 | 4/1972 |
| JP | 57-150035 | 9/1982 |
| JP | 7-47880 A | 2/1995 |
| JP | 7-242147 | 9/1995 |
| JP | 3872790 B2 | 10/2006 |

OTHER PUBLICATIONS

Japanese Office Action mailed May 15, 2012 and the English translation thereof (Japanese Application No. 2008-154337).

* cited by examiner

*Primary Examiner* — Todd M Epps
(74) *Attorney, Agent, or Firm* — Roberts Mlotkowski Safran & Cole P.C.

(57) ABSTRACT

A sliding torque between a pivot portion and a fitting portion may be preferably secured. In an inner mirror device, pivot portions are arranged on both end portions in an axis line direction of a stay formed by a resin material. One pivot portion is fitted in a fitting hole of a holder main body, and the other pivot portion is fitted in a fitting hole of a device main body. In this manner, the holder and the device main body are connected to each other through the stay. In this case, plural notches are formed in the pivot portions, and outside dimensions of the pivot portions may be elastically expanded and reduced. A metal spring pin is pressed into the stay, and the spring pin biases the pivots in a dimension-expansion direction.

20 Claims, 3 Drawing Sheets

PIVOT CONNECTING STRUCTURE

CROSS-REFERENCE TO RELATED APPLICATION

This application claims priority under 35 USC 119 from Japanese Patent Application No. 2008-154337, the disclosure of which is incorporated by reference herein.

BACKGROUND OF THE INVENTION

1. Field of the Invention

The present invention relates to a pivot connecting structure to rotatably connect a member to be connected such as a vehicle inner mirror to a stay.

2. Related Art

In a conventional vehicle inner mirror device (for example, see Japanese Patent No. 3872790), a mirror case constituting a main body of an inner mirror device and a base which is fixed to an automobile windshield are connected to each other by a stay having pivot portions arranged on both the sides. The pivot portions are press-fitted in sockets arranged on the mirror case and the base. The pivot portions and the sockets slidably move to allow the mirror case and the base to be rotated with respect to the stay.

In the inner mirror device described above, when a material of, for example, the stay is a resin, a sliding torque between the pivot portion and the socket (a fitting portion) decreases in a high-temperature state, support rigidity of the main body of the device may be deteriorated.

SUMMARY OF THE INVENTION

The present invention provides a pivot connecting structure which preferably secure a sliding torque between a pivot portion and a fitting portion.

A pivot connecting structure according to a first aspect of the invention includes: a stay which is cylindrically formed, and in which a pivot portion having a spherical outer surface is provided at one end side in an axis line direction, dimension of an outer diameter of the pivot portion being able to change elastically; a connected member which includes a fitting portion, the inside of which the pivot portion is fitted to, and which is connected to the stay, rotation of the connected member with respect to the stay being allowed by slidably moving of the pivot portion and the fitting portion; and an insertion member which is inserted inside the stay and which biases the pivot portion in a diameter-expansion direction of the pivot portion.

In the pivot connecting structure according to the first aspect of the invention, the pivot portion arranged on the one end side in the axis direction of the stay is fitted to the inside of the fitting portion arranged on the connected member to connect the stay and the connected member, and the pivot portion and the fitting portion slidably move to allow the connected member to rotate (pivot) with respect to the stay.

In this case, in the pivot connecting structure, the outer diameter dimension of the pivot portion of the stay can be elastically changed. The insertion member is inserted inside the stay, and the insertion member biases the pivot portion in the diameter-expansion direction (in the direction in which the outer diameter dimension of the pivot portion expands). In this manner, since an outer circumference surface of the pivot portion is preferably brought into press contact with the inside of the fitting portion, a sliding torque between the pivot portion and the fitting portion can be preferably secured.

A pivot connecting structure according to a second aspect of the invention includes:

a stay which is cylindrically formed, and in which a pivot portion having a spherical outer surface is provided at one end side in an axis line direction, dimension of an outer diameter of the pivot portion being able to change elastically; a connected member which includes a fitting portion, the inside of which the pivot portion is fitted to, and which is connected to the stay, rotation of the connected member with respect to the stay being allowed by slidably moving of the pivot portion and the fitting portion; and an insertion member which is inserted inside the stay and which gives the pivot portion a resistance force against a deformation in a diameter-reduction direction of the pivot portion.

In the pivot connecting structure according to the second aspect of the invention, the pivot portion arranged on the one end side in the axis direction of the stay is fitted to the inside of the fitting portion arranged on the connected member to connect the stay and the connected member, and the pivot portion and the fitting portion slidably move to allow the connected member to rotate (pivot) with respect to the stay.

In this case, in the pivot connecting structure, the outer diameter dimension of the pivot portion of the stay can be elastically changed. The insertion member is inserted inside the stay, and the insertion member gives the resistance force against the deformation in the diameter-reduction direction (reduction of the outer diameter dimension) of the pivot portion. In this manner, since a fitting state of the pivot portion to the fitting portion can be preferably maintained, a sliding torque between the pivot portion and the fitting portion can be preferably secured.

In the pivot connecting structure according to the first and the second aspects of the invention, plural cut portions or plural thin parts may be formed in the pivot portion along a circumference direction.

In a pivot connecting structure according to a third aspect of the invention, in the pivot connecting structure according to the first aspect or the second aspect of the invention, the connected member is one of a fixed member that is fixed to a vehicle or a device main body of a vehicle inner mirror device, and the stay is provided at the other of the fixed member or the device main body.

In the pivot connecting structure according to the third aspect of the invention, the fitting portion is provided at one of the fixed member that is fixed to the vehicle or the device main body of the vehicle inner mirror device, and the pivot portion of the stay provided at the other of the fixed portion or the device main body. Since a sliding torque between the pivot portion and the fitting portion is secured by the insertion member inserted inside the stay, the other can be suppressed from being unnecessarily pivoted with respect to the one, and support rigidity of the device main body can be improved. In this manner, rearward visibility realized by the device main body (mirror) can be improved.

A pivot connecting structure according to a fourth aspect of the invention includes:

a stay which is cylindrically formed, and in which pivot portions each having a spherical outer surface are provided at both end sides in an axis line direction, dimensions of outer diameters of the pivot portions being able to change elastically; a first connected member which includes a first fitting portion, the inside of which one of the pivot portions is fitted to, and which is connected to the stay, rotation of the first connected member with respect to the stay being allowed by slidably moving of the one of the pivot portions and the first fitting portion; a second connected member which includes a second fitting portion, the inside of which the other of the pivot portions is fitted to, and which is connected to the stay, rotation of the second connected member with respect to the stay being allowed by slidably moving of the other of the pivot portions and the second fitting portion; and an insertion member which is inserted inside the stay and which biases each pivot portion in diameter-expansion direction of the pivot portion.

In the pivot connecting structure according to the fourth aspect of the invention, the one of the pivot portions arranged on the one end side in the axis line direction of the stay is fitted to the inside of the first fitting portion arranged on the first connected member to connect the stay and the first connected member to each other, and the one of the pivot portions and the first fitting portion slidably move to allow the first connected member to rotate (pivot) with respect to the stay. The other of the pivot portions arranged on the other end side in the axis line direction of the stay is fitted to the inside of the second fitting portion arranged on the second connected member to connect the stay and the second connected member to each other, and the other of the pivot portions and the second fitting portion slidably move to allow the second connected member to rotate (pivot) with respect to the stay.

In the pivot connecting structure, the outer diameter dimension of each of the pivot portions of the stay can be elastically changed. The insertion member is inserted into the stay, and the insertion member biases each of the pivot portions in the diameter-expansion direction (in the direction in which the outer diameter dimension of each of the pivot portions expands). In this manner, since the outer circumference surfaces of the pivot portions are preferably brought into press contact with the inside of the first fitting portion and the second fitting portion respectively, sliding torques between the respective pivot portions and the first fitting portion and the second fitting portion can be preferably secured.

A pivot connecting structure according to a fifth aspect of the invention includes: a stay which is cylindrically formed, and in which pivot portions each having a spherical outer surface are provided at both end sides in an axis line direction, dimensions of outer diameters of the pivot portions being able to change elastically;
a first connected member which includes a first fitting portion, the inside of which one of the pivot portions is fitted to, and which is connected to the stay, rotation of the first connected member with respect to the stay being allowed by slidably moving of the one of the pivot portions and the first fitting portion; a second connected member which includes a second fitting portion, the inside of which the other of the pivot portions is fitted to, and which is connected to the stay, rotation of the second connected member with respect to the stay being allowed by slidably moving of the other of the pivot portions and the second fitting portion; and an insertion member which is inserted inside the stay and which gives each pivot portion a resistance force against a deformation in a diameter-reduction direction of the pivot portion.

In the pivot connecting structure according to the fifth aspect of the invention, the one of the pivot portions arranged on the one end side in the axis line direction of the stay is fitted to the inside of the first fitting portion arranged on the first connected member to connect the stay and the first connected member to each other, and the one of the pivot portions and the first fitting portion slidably move to allow the first connected member to rotate (pivot) with respect to the stay. The other of the pivot portion arranged on the other end side in the axis line direction of the stay is fitted to the inside of the second fitting portion arranged on the second connected member to connect the stay and the second connected member to each other, and the other of the pivot portions and the second fitting portion slidably move to allow the second connected member to rotate (pivot) with respect to the stay.

In the pivot connecting structure, the outer diameter dimension of each of the pivot portions of the stay can be elastically changed. The insertion member is inserted inside the stay, and the insertion member gives the resistance force against the deformation in the diameter-reduction direction (reduction of the outer diameter dimension) of each of the pivot portions. In this manner, since a fitting state of the pivot portions to the first fitting portion and the second fitting portion respectively can be preferably maintained, sliding torques between the respective pivot portions and the first fitting portion and the second fitting portion can be preferably secured.

In the pivot connecting structure according to the fourth and the fifth aspects of the invention, plural cut portions or plural thin parts may be formed in the respective pivot portions along a circumference direction.

In the pivot connecting structure according to a sixth aspect of the invention, in the pivot connecting structure according to the forth aspect or the fifth aspect of the invention, the first connected member is a fixed member that is fixed to a vehicle, and the second connected member is an device main body of a vehicle inner mirror device.

In the pivot connecting structure according to the sixth aspect of the invention, the one of the pivot portions of the stay is fixed to the first fitting portion arranged on the fixed member fixed to the vehicle, and the other of the pivot portions of the stay is fitted to the second fitting portion arranged on the device main body of the vehicle inner mirror device. In this manner, the fixed member and the device main body are connected to each other through the stay. In this case, since the sliding torques between the respective pivot portions and the first fitting portion and the second fitting portion of the stay are secured by the insertion member inserted inside the stay, the device main body can be suppressed from being unnecessarily pivoted with respect to the fixed member, and support rigidity of the device main body can be improved. In this manner, rearward visibility realized by the device main body (mirror) can be improved.

In the pivot connecting structure according to a seventh aspect of the invention, in the pivot connecting structure according to any one of the first aspect to the fourth aspect of the invention, the insertion member is cylindrically formed.

In the pivot connecting structure according to the seventh aspect of the invention, the insertion member inserted inside the stay is cylindrically formed. For this reason, for example, even though an electric instrument is mounted on the connected member, an electric power may be supplied to the electric instrument via a cord (an electric cable) which passes inside the stay (inside the insertion member). Therefore, a preferable appearance may be obtained.

In a pivot connecting structure according to an eighth aspect of the invention, in the pivot connecting structure according to the seventh aspect of the invention, a slit is formed in the insertion member such that the insertion member can be elastically deformed in a diameter-reduction direction, and the insertion member is pressed into the stay in a state in which the insertion member is deformed in the diameter-reduction direction.

In the pivot connecting structure according to the eighth aspect of the invention, the cylindrical insertion member in which the slit is formed is inserted into the stay in a state in which the insertion member is deformed (reduced) in the diameter-reduction direction elastically. In this manner, since the pivot portion of the stay is biased in the diameter-expansion direction, or the resistance force against the deformation in the diameter-reduction direction is given, the insertion member can have a simple configuration.

As described above, in the pivot connecting structure according to the invention, a sliding torque between the pivot portion and the fitting portion can be preferably secured.

BRIEF DESCRIPTION OF THE DRAWINGS

Exemplary embodiment of the present invention will be described in detail with reference to the following figures, wherein.

DETAILED DESCRIPTION OF THE INVENTION

Figure 1:
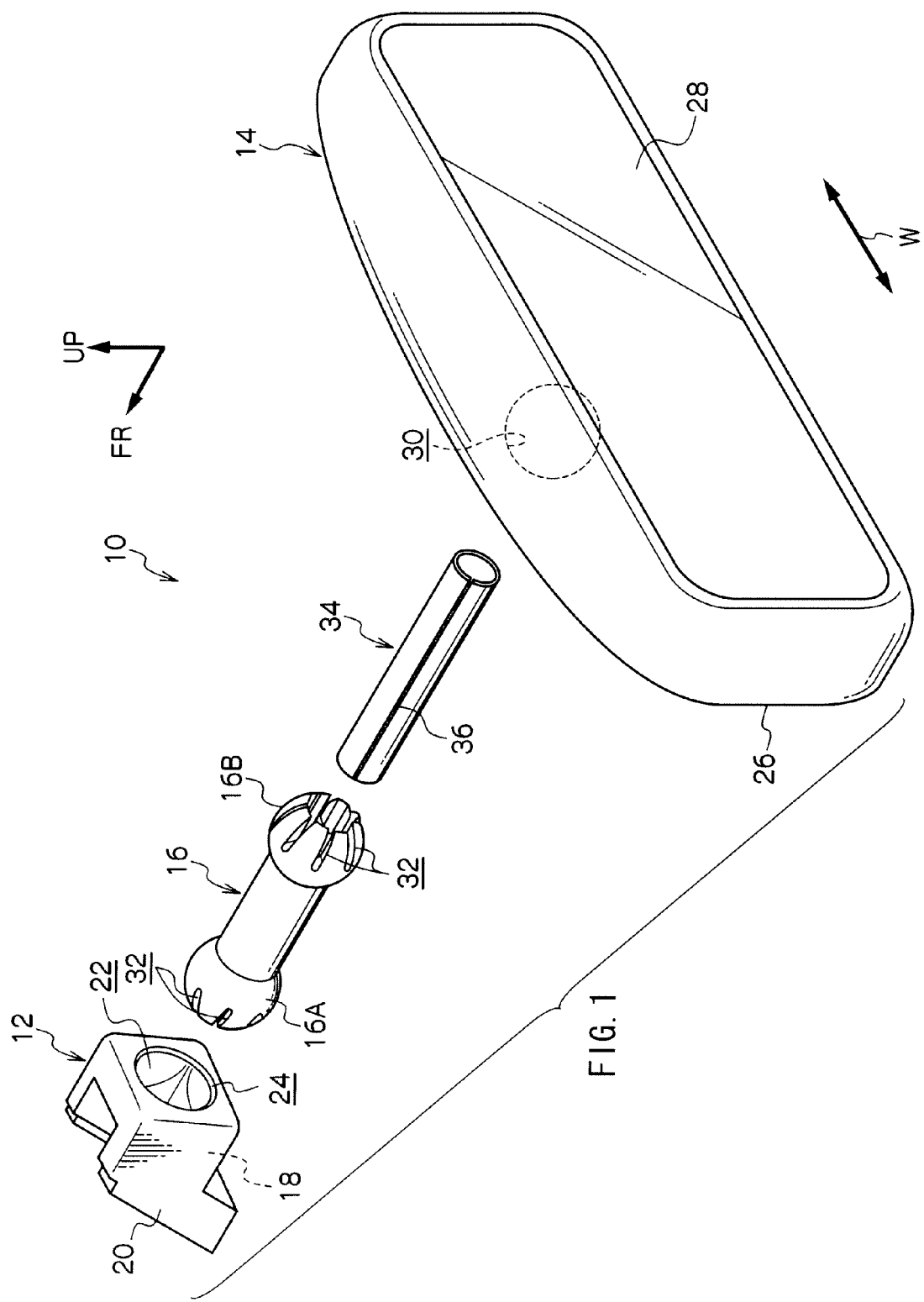
FIG. 1 is a schematic exploded perspective view showing a configuration of a vehicle inner mirror device to which a pivot connecting structure according to an exemplary embodiment of the invention.
Figure 2:
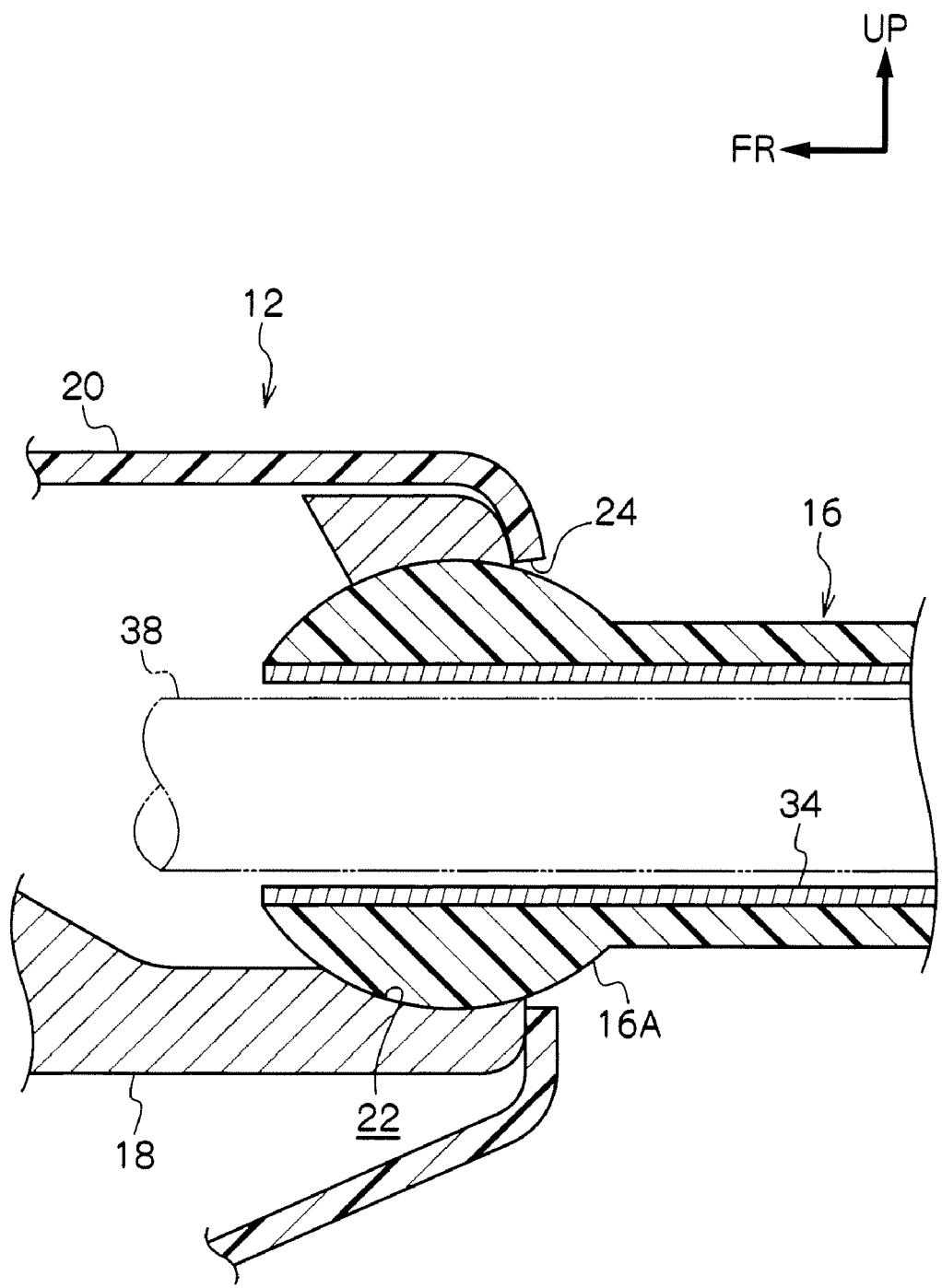
FIG. 2 is a sectional view showing a partial configuration of the inner mirror device shown in FIG. 1.

FIG. 1 shows a vehicle inner mirror device 10 to which a pivot connecting structure according to an exemplary embodiment of the invention as a schematic exploded perspective view. FIG. 2 shows a partial configuration of the inner mirror device 10 as a sectional view. In FIGS. 1 and 2, an arrow FR indicates a forward direction of a vehicle in which the inner mirror device is installed, an arrow UP indicates an upper direction of the vehicle, and an arrow W indicates a width direction of the vehicle.

As shown in FIG. 1, the vehicle inner mirror device 10 includes a holder 12 (a fixed member), an device main body 14, and a stay 16 which connects the holder 12 and the device main body 14 to each other. As shown in FIG. 2, the holder 12 includes a holder main body 18 made of metal, and a resin cover 20 which covers the holder main body 18. The holder main body 18 is fixed to a surface of an automobile-interior side at an upper portion of a windshield glass (not shown in the drawings). A fitting hole 22 (a first fitting portion) which opens toward the rear side of the vehicle is formed in the holder main body 18, and the fitting hole 22 is exposed toward the rear side of the vehicle through a through hole 24 which is formed in the cover 20. The fitting hole 22 is formed so as to be according to the dray 16.

On the other hand, the device main body 14 includes an inner mirror case 26 having an approximately thin-box-like shape whose longitudinal direction is along a vehicle width direction. An end portion of the inner mirror case 26 at the rear side of the vehicle is opened, and a mirror 28 for rear viewing of the vehicle is vertically held in the opening portion. A fitting hole 30 serving as a second fitting portion is formed in the inner mirror case 26 at the front side of the vehicle. The fitting hole 30 is formed so as to be according to the stay 16.

The stay 16 is cylindrically formed by a resin material, and pivot portions 16A and 16B are provided respectively on both end portions of the stay 16 in an axis line direction. The pivot portions 16A and 16B are formed such that the both end portions of the stay 16 in the axis line direction expand to the outside of the stay 16 in a radial direction so as to form ball (sphere) shape, and have spherical outer circumference surfaces respectively. In each of the pivot portions 16A and 16B, plural notches (cut portions) 32 to make a part of the pivot portion elastically deformable are formed. The notches 32 are formed so as to respectively extend from the end portions in the axis line direction of the stay 16 (from an end portion at the vehicle forward side of the pivot portion 16A and from an end portion at the vehicle rearward side of the pivot portion 16B) along the axis line direction of the stay 16, and arranged at equal intervals in a circumference direction of the stay 16. For this reason, the pivot portions 16A and 16B are easily flexible at positions, which are in the vicinity of roots, between the adjacent notches 32, so that the dimensions (the outer diameter) of the pivot portions 16A and 16B can be elastically expanded and reduced.

In the stay 16 having the above configuration, one pivot portion 16A is fitted in the fitting hole 22 of the holder main body 18, and the other pivot portion 16B is fitted in the fitting hole 30 of the device main body 14. In this manner, the device main body 14 and the holder main body 18 are connected to each other through the stay 16.

As shown in FIG. 2, an inner circumference surface of the fitting hole 22 is spherically formed so as to be brought into tight contact with an outer circumference surface of the pivot portion 16A, an inner diameter dimension of the opening portion of the fitting hole 22 is set to be slightly smaller than an outer diameter dimension (the maximum value) of the pivot portion 16A. For this reason, when the pivot portion 16A is inserted into the fitting hole 22, the diameter dimension of the pivot portion 16A is elastically reduced, and the pivot portion 16A is allowed to be inserted into the fitting hole 22. Then, the pivot portion 16A is elastically restored (expanded) in the fitting hole 22 so as to bring the outer circumference surface of the pivot portion 16A into tight contact with the inner circumference surface of the fitting hole 22. In this state, the pivot portion 16A is suppressed from being unnecessarily pulled out from the fitting hole 22. The stay 16 is allowed to be pivoted (rotated) with respect to the device main body 14 in a predetermined range by slidably moving of the outer circumference surface of the pivot portion 16A and the inner circumference surface of the fitting hole 22. So, a connection angle between the device main body 14 and the stay 16 can be adjusted.

Although not shown in the drawings, the fitting structure between the pivot portion 16B and the fitting hole 30 is basically the same as the structure described above, and a connection angle of the stay 16 can be adjusted with respect to the device main body 14.

In the exemplary embodiment, a spring pin 34 (an insertion member) which is cylindrically formed by a metal material is inserted into the stay 16. The spring pin 34 is formed to have a length equal to that of the stay 16. In the spring pin 34, a slit 36 (notch) along the axis line direction is formed in its overall length. In this manner, the dimension (the diameter) of the spring pin 34 can be elastically reduced, and the spring pin 34 is pressed into the stay 16 in a state in which the dimension (the diameter) of the spring pin 34 is slightly reduced. For this reason, the spring pin 34 biases the pivot portions 16A and 16B in a diameter-expansion direction (in the radial outside direction of the stay 16) (resistance force is given against deformation in diameter-reduction direction of each of the pivot portions 16A and 16B). In this manner, the outer circumference surfaces of the pivot portions 16A and 16B are brought into press contact with the inner circumference surfaces of the fitting holes 22 and 30.

For this reason, an approximately constant sliding torque (frictional force) acts between the pivot portions 16A and 16B and the fitting holes 22 and 30. The stay 16 is not pivoted with respect to the holder main body 18 and the device main body 14 unless an external force larger than the sliding torque acts. In this manner, the device main body 14 is maintained in such a posture that an angle thereof is adjusted by a driver of the vehicle.

In the exemplary embodiment, as shown in FIG. 2, a wiring cord 38 penetrates the inside of the spring pin 34 (the inside of the stay 16). The wiring cord 38 has one end side which is electrically connected to a battery or the like (not shown in the drawings) mounted on the vehicle, and has the other end side which is electrically connected to an electric instrument (for example, a sensor, a camera, or the like) (not shown in the drawings) mounted in the device main body 14. In this manner, an electric power is supplied to the electric instrument through the wiring cord 38.

An operation of the exemplary embodiment will be described below.

In the inner mirror device 10 having the above configuration, the pivot portion 16A arranged on the one end side in the axis line direction of the stay 16 is fitted in the fitting hole 22 formed in the holder main body 18 to connect the stay 16 and the holder main body 18 to each other. The pivot portion 16A and the fitting hole 22 slidably move to allow the stay 16 to be pivoted with respect to the holder main body 18. The other pivot portion 16B arranged on the other end side in the axis line direction of the stay 16 is fitted in the fitting hole 30 formed in the device main body 14 to connect the stay 16 and the device main body 14 to each other. The pivot portion 16B and the fitting hole 30 slidably move to allow the device main body 14 to be pivoted with respect to the stay 16. For this reason, a driver of the vehicle can adjust the angle of the device main body 14 to have a posture which causes the driver to easily visually check the rear of the vehicle with the mirror 28.

In a normal state, pivoting of the stay 16 with respect to the holder main body 18 is regulated by the sliding torque (the frictional force) acting between the pivot portion 16A and the fitting hole 22, and pivoting of the device main body 14 with respect to the stay 16 is regulated by the sliding torque (the frictional force) acting between the pivot portion 16B and the fitting hole 30. For this reason, the device main body 14 is kept in a state in which the angle of the device main body 14 is adjusted by a vehicle driver.

In this case, in the exemplary embodiment, plural notches 32 are formed in the pivot portions 16A and 16B of the stay 16 formed by a resin material, and the outer diameter dimensions of the pivot portions 16A and 16B can be elastically expanded or reduced. The metal spring pin 34 is press-fitted inside the stay 16, and the spring pin 34 biases the pivot portions 16A and 16B in a dimension-expansion direction. In this manner, since the outer circumference surfaces of the pivot portions 16A and 16B are preferably brought into press contact with the inner circumference surfaces of the fitting holes 22 and 30, sliding torques between the pivot portions 16A and 16B and the fitting holes 22 and 30 can be preferably secured as planned.

Furthermore, since the pivot portions 16A and 16B formed by the resin material are supported by the metal spring pin 34, even at a high-temperature state at which the resin material may soften, sliding torques between the pivot portions 16A and 16B and the fitting holes 22 and 30 can be preferably secured.

Since the stay 16 is formed by the resin material, the stay 16 may be colored when the stay 16 is formed, and a process to paint the stay 16 can be omitted. In this manner, the manufacturing cost of the stay 16 can be reduced.

When the pivot portions 16A and 16B of the stay 16 are fitted in the fitting holes 22 and 30, respectively, (when manufacturing of the vehicle inner mirror device 10), the dimensions (the diameters) of the pivot portions 16A and 16B are elastically reduced, so that the pivot portions 16A and 16B can be easily fitted in the fitting holes 22 and 30, respectively. Therefore, the assembling process of the inner mirror device 10 can be simplified.

In addition, as described above, when the dimension (the diameter) of the pivot portion 16A is reduced, the pivot portion 16A can be easily fitted in the fitting hole 22. For this reason, a metal material can be used as the material of the holder main body 18, so the rigidity of the holder main body 18 can be sufficiently secured. In this manner, the support rigidity of the device main body 14 can be improved, and vibration of the device main body 14 in a driving state can be suppressed. For this reason, rearward visibility realized by the mirror 28 can be improved.

In addition, since the single spring pin 34 biases the two pivot portions 16A and 16B, the number of components can be reduced, and resource saving and a cost reduction can be achieved.

The spring pin 34 is cylindrically formed, and the wiring cord 38 for supplying the electric power to the electric instrument mounted on the device main body 14 is arranged inside the spring pin 34 (inside the stay 16). For this reason, the wiring cord 38 is not exposed outside the device. Therefore, a preferable appearance can be obtained.

The dimension (the diameter) of the spring pin 34 can be elastically reduced by forming thereat the slit 36, and the spring pin 34 is inserted into the stay 16 in a state in which the dimension (the diameter) of the spring pin 34 is reduced. Due to this, the pivot portions 16A and 16B of the stay 16 are biased in the diameter-expansion direction. The spring pin 34 can have a simple configuration.

In the explanation of the above exemplary embodiment, the cylindrical spring pin 34 having the slit 36 formed therein is applied as the insertion member. The invention is not limited to this configuration, and the configuration of the insertion member may be arbitrarily changed.

In the exemplary embodiment, the spring pin 34 inserted inside the stay 16 actively biases the pivot portions 16A and 16B in the diameter-expansion direction. However, the invention is not limited to this configuration. Even though the spring pin 34 simply gives the resistance force against reductions in diameters of the pivot portions 16A and 16B (for example, the spring pin 34 simply supports the pivot portions 16A and 16B from the inside by the spring pin 34 simply abutting the inside surfaces of the pivot portions 16A and 16B), the fitting states of the pivot portions 16A and 16B with respect to the fitting holes 22 and 30 can be preferably maintained. For this reason, the sliding torque between the pivot portions 16A and 16B and the fitting holes 22 and 30 can be preferably secured.

In the exemplary embodiment, the two pivot portions 16A and 16B are biased by the single spring pin 34. The invention is not limited to this configuration. One spring pin (the insertion member) is provided for each of the pivot portions 16A and 16B, so that spring pins may independently bias the pivot portions 16A and 16B, respectively.

Figure 3:
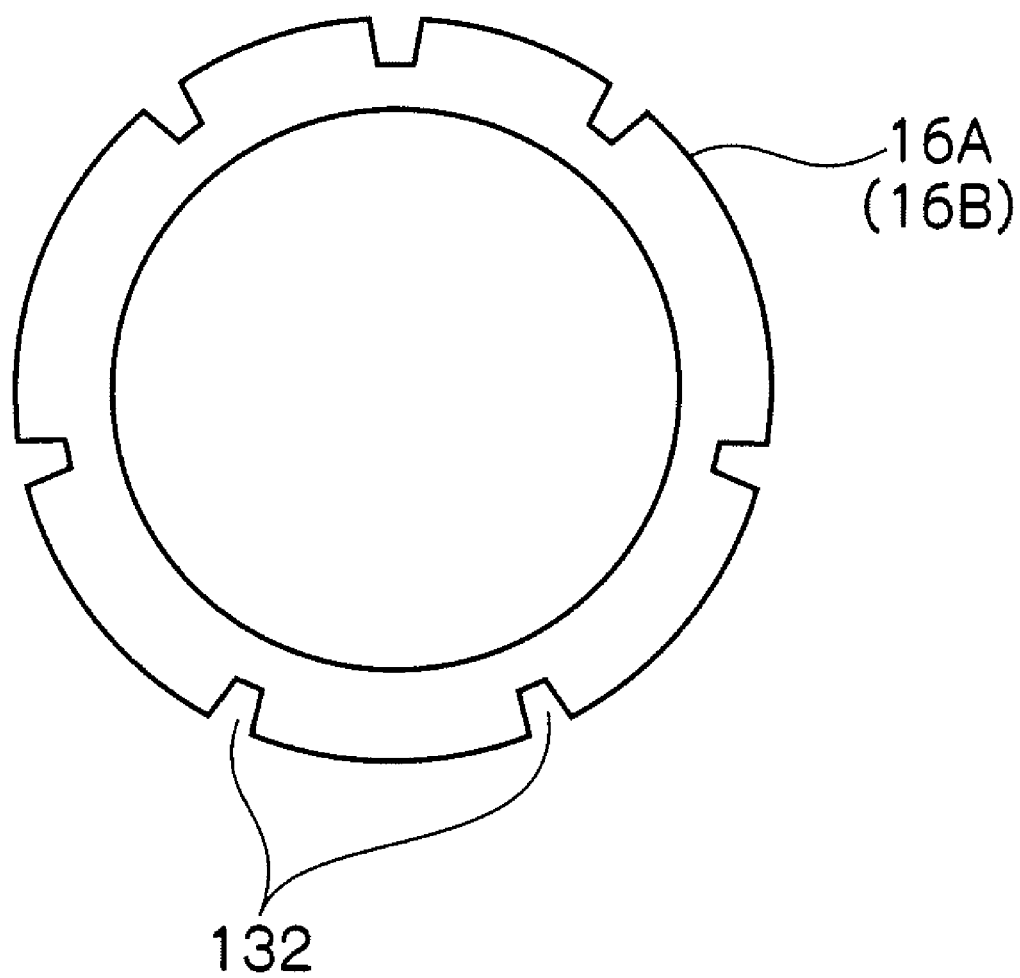
FIG. 3 is a sectional view showing a modified pivot portion of the inner mirror device shown in FIG. 1.

In the exemplary embodiment, in order to make the outer diameter dimensions of the pivot portions 16A and 16B changeable, the plural notches 32 are formed in the pivot portions 16A and 16B. However, the invention is not limited to this configuration. For example, plural thin parts 132 as shown in FIG. 3 may be formed in the pivot portions 16A and 16B.

In the explanation of the exemplary embodiment, the pivot connecting structure according to the invention is applied to the vehicle inner mirror device. However, the invention is not limited to this configuration. The invention may also be applied to another device or a component including a connecting structure obtained by a pivot.

What is claimed is:

1. A pivot connecting structure for a rearview mirror comprising:
   a stay which is cylindrically formed, a pivot portion having a spherical outer surface being formed at the stay at one end in an axis line direction of the stay, a dimension of an outer diameter of the pivot portion being able to be changed elastically;
   a connected member which includes a fitting portion, the inside of which the pivot portion is fitted to, and which is connected to the stay, rotation of the connected member with respect to the stay being allowed by slidably moving of the pivot portion and the fitting portion; and
   an insertion member which is inserted inside the stay and inside the pivot portion and which biases the pivot portion in a diameter-expansion direction of the pivot portion.

2. The pivot connecting structure of claim 1, wherein the connected member is one of a fixed member that is fixed to a vehicle or a device main body of a vehicle inner mirror device, and the stay is provided at the other of the fixed member or the device main body.

3. The pivot connecting structure of claim 1, wherein plural cut portions or plural thin parts are formed in the pivot portion along a circumference direction.

4. The pivot connecting structure of claim 1, wherein the insertion member is a tube member.

5. The pivot connecting structure of claim 4, wherein a slit is formed in the insertion member along a longitudinal direction of the insertion member such that the insertion member can be elastically deformed in a diameter-reduction direction, and the insertion member is pressed into the stay in a state in which the insertion member is deformed in the diameter-reduction direction.

6. A pivot connecting structure for a rearview mirror comprising:
   a stay which is cylindrically formed, a pivot portion having a spherical outer surface being formed at the stay at one end in an axis line direction of the stay, a dimension of an outer diameter of the pivot portion being able to change elastically;
   a connected member which includes a fitting portion, the inside of which the pivot portion is fitted to, and which is connected to the stay, rotation of the connected member with respect to the stay being allowed by slidably moving of the pivot portion and the fitting portion; and
   an insertion member which is inserted inside the stay and inside the pivot portion and which gives the pivot portion a resistance force against a deformation in a diameter-reduction direction of the pivot portion.

7. The pivot connecting structure of claim 6, wherein the connected member is one of a fixed member that is fixed to a vehicle or a device main body of a vehicle inner mirror device, and the stay is provided at the other of the fixed member or the device main body.

8. The pivot connecting structure of claim 6, wherein plural cut portions or plural thin parts are formed in the pivot portion along a circumference direction.

9. The pivot connecting structure of claim 6, wherein the insertion member is a tube member.

10. The pivot connecting structure of claim 9, wherein a slit is formed in the insertion member along a longitudinal direction of the insertion member such that the insertion member can be elastically deformed in a diameter-reduction direction, and the insertion member is pressed into the stay in a state in which the insertion member is deformed in the diameter-reduction direction.

11. A pivot connecting structure for a rearview mirror comprising:
    a stay which is cylindrically formed, pivot portions each having a spherical outer surface being formed at the stay at both ends in an axis line direction of the stay, dimensions of outer diameters of the pivot portions being able to change elastically;
    a first connected member which includes a first fitting portion, the inside of which one of the pivot portions is fitted to, and which is connected to the stay, rotation of the first connected member with respect to the stay being allowed by slidably moving of the one of the pivot portions and the first fitting portion;
    a second connected member which includes a second fitting portion, the inside of which the other of the pivot portions is fitted to, and which is connected to the stay, rotation of the second connected member with respect to the stay being allowed by slidably moving of the other of the pivot portions and the second fitting portion; and
    an insertion member which is inserted inside the stay and inside the pivot portions and which biases each pivot portion in diameter-expansion direction of the pivot portion.

12. The pivot connecting structure of claim 11, wherein the first connected member is a fixed member that is fixed to a vehicle, and the second connected member is an device main body of a vehicle inner minor device.

13. The pivot connecting structure of claim 11, wherein plural cut portions or plural thin parts are formed in the respective pivot portions along a circumference direction.

14. The pivot connecting structure of claim 11, wherein the insertion member is a tube member.

15. The pivot connecting structure of claim 14, wherein a slit is formed in the insertion member along a longitudinal direction of the insertion member such that the insertion member can be elastically deformed in a diameter-reduction direction, and the insertion member is pressed into the stay in a state in which the insertion member is deformed in the diameter-reduction direction.

16. A pivot connecting structure for a rearview mirror comprising:
    a stay which is cylindrically formed, pivot portions each having a spherical outer surface being formed at the stay at both ends in an axis line direction of the stay, dimensions of outer diameters of the pivot portions being able to change elastically;
    a first connected member which includes a first fitting portion, the inside of which one of the pivot portions is fitted to, and which is connected to the stay, rotation of the first connected member with respect to the stay being allowed by slidably moving of the one of the pivot portions and the first fitting portion;
    a second connected member which includes a second fitting portion, the inside of which the other of the pivot portions is fitted to, and which is connected to the stay, rotation of the second connected member with respect to the stay being allowed by slidably moving of the other of the pivot portions and the second fitting portion; and
    an insertion member which is inserted inside the stay and inside the pivot portions and which gives each pivot portion a resistance force against a deformation in a diameter-reduction direction of the pivot portion.

17. The pivot connecting structure of claim 16, wherein the first connected member is a fixed member that is fixed to a vehicle, and the second connected member is an device main body of a vehicle inner minor device.

18. The pivot connecting structure of claim 16, wherein plural cut portions or plural thin parts are formed in the respective pivot portions along a circumference direction.

19. The pivot connecting structure of claim 16, wherein the insertion member is a tube member.

20. The pivot connecting structure of claim 19, wherein a slit is formed in the insertion member along a longitudinal direction of the insertion member such that the insertion member can be elastically deformed in a diameter-reduction direction, and the insertion member is pressed into the stay in a state in which the insertion member is deformed in the diameter-reduction direction.

* * * * *